UNITED STATES PATENT OFFICE 2,328,644

HEAT INSULATING MATERIAL

Arthur H. Happe, Detroit, Mich., assignor of one-half to Herman A. Sperlich, Detroit, Mich.

No Drawing. Application January 25, 1941, Serial No. 375,923

2 Claims. (Cl. 106—84)

The present invention relates to compositions of matter particularly useful, in molded form, as heat resisting and insulating elements. More specifically it relates to a heat insulating and reflecting material for hearth plates of open coil type, electric resistance heated range burners or other electric heaters.

Among the objects of the invention is a molded composition that will have high strength and light weight, will have high heat insulation and low heat absorption characteristics, and be little or not at all affected by the spillage thereon of liquids and subsequent heaters.

With these and other objects in view, the invention consists broadly in a vitrified composition made up of a high porous granular siliceous material suitably compacted with a binder carrying in suspension a material capable of screening out radiant energy, which binder has been thoroughly mixed with the granular material.

The granular material may be produced from any one of several micaceous minerals capable of exfoliation, such as vermiculite, zonolite, maconite, jeffersite, but of these vermiculate or zonolite is preferred.

In preparing the granular material, the mineral is first crushed to rather finely granular form, and then heated to produce the exfoliation, after which it is again crushed to produce substantially uniform grains of about the size of coarse sand.

To such material is added a strongly alkaline siliceous binder consisting of preferably sodium silicate in water solution to which has been added the radiant energy screening material which may be chromium oxide (green) $Cr_2O_3$, calcium sulfate, ordinary potassium alum or other sulfate. When the binder has been thoroughly mixed, the resultant mass is compressed in suitable molds, allowed to dry, or dried by heating, and subjected to a temperature sufficient to produce vitrification (from 700° to 900° F.) some of the excess alkali of the binder apparently combining with some of the silica content of the micaceous material.

The resulting vitrified material is light in weight, quite strong, unaffected by spilled materials when used in cooking operations, and highly efficient as a heat insulator and reflector.

A specific example of the mixture which has been found to give excellent results is as follows:

Exfoliated vermiculite (or zonolite) __gms__ 2000
Sodium silicate solution (sp. gr. 1.71—Bé. 60°) _____gms__ 200
Screening material (green oxide of chrome) _____gms__ 300
Additional water_____cc__ 1000

It is of course obvious that these proportions may be varied considerably with a consequent variation of the physical properties of the resulting material.

For example, less of the binder silicate will produce a less strong material while an increase of the binder tends to decrease the heat insulation value, and more or less of the screening material obviously produces more or less screening out of radiant energy.

Now having described the invention, what is claimed is:

1. A composition of matter consisting of a vitrified mass of particles of exfoliated vermiculite, siliceous binding material, and green oxide of chromium.

2. A composition of matter consisting of the resultant of mixing together and heating to a vitrifying temperature, exfoliated vermiculite and strongly alkaline sodium silicate solution containing in suspension green oxide of chromium, substantially in the proportions of 2000 gms. of vermiculite, 200 gms. sodium silicate solution, and 300 gms. of the chromium oxide.

ARTHUR H. HAPPE.